F. A. HEADSON.
PROCESS OF MAKING A HEAT INSULATING COMPOSITION.
APPLICATION FILED JAN. 22, 1917.

1,283,754.

Patented Nov. 5, 1918.

Witnesses:

Inventor:
Frank A. Headson,
By Harry Irwin Grimes
Atty.

UNITED STATES PATENT OFFICE.

FRANK A. HEADSON, OF MILWAUKEE, WISCONSIN.

PROCESS OF MAKING A HEAT-INSULATING COMPOSITION.

1,283,754.   Specification of Letters Patent.   Patented Nov. 5, 1918.

Application filed January 22, 1917. Serial No. 143,722.

*To all whom it may concern:*

Be it known that I, FRANK A. HEADSON, a citizen of the United States, residing in Milwaukee, in the county of Milwaukee and State of Wisconsin, have invented certain new and useful Improvements in Processes of Making a Heat-Insulating Composition, of which the following is a specification.

This invention relates to that class of heat insulating materials, compounds or plastic compositions which are adapted to be used in the form of, or made into bricks, blocks or similar articles suitable for forming heat insulating walls of furnaces or other structures, or which may be used as a cement, and to the process of making such compositions, and articles to be made therefrom.

The principal object of the invention is to provide a simple, economical and efficient heat-resisting and heat-insulating compound, or material, and heat-insulating blocks, bricks, or similar articles made therefrom, and an improved process of making the same.

Other and further objects of the invention will appear from the following description and from an inspection of the accompanying drawings, which are made a part hereof.

Subject matter of invention herein described and shown but not claimed will be found described and claimed in my application, Serial No. 256,500 and my application Serial No. 256,501 for Letters Patent of the United States both filed in the United States Patent Office in the name of Frank A. Headson on or about October 2, 1918, for improvements in heat-insulating compositions and articles made therefrom; to which reference is hereby made.

The invention consists in the combination of elements and in the composition or heat-insulating compound and articles made therefrom, and in the method of making the same, herein described and claimed.

Figure 1:
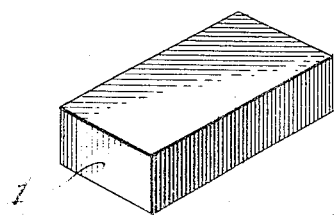
Figure 2:
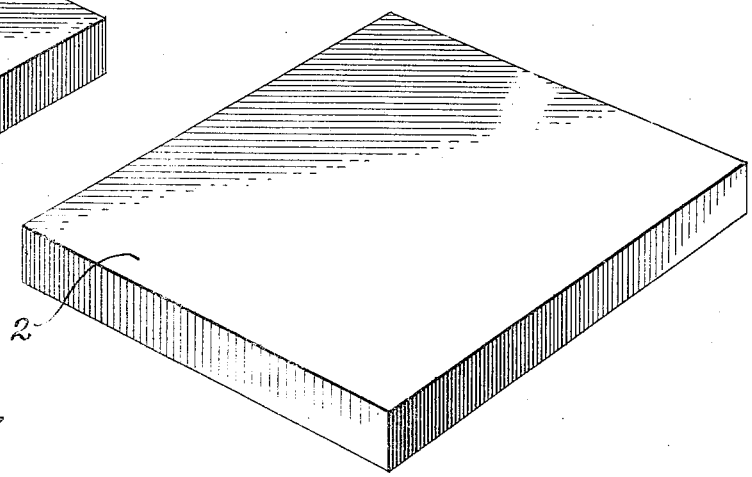
Figure 4:
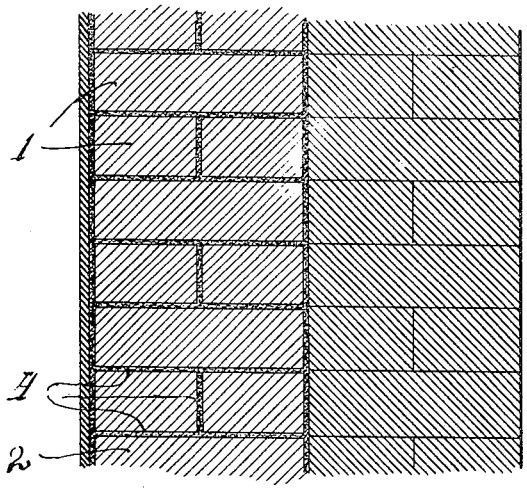
Figure 3:
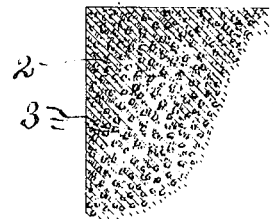

In the accompanying drawings, Figure 1 is a perspective view of a heat-insulating brick or block made in accordance with my invention;

Fig. 2, a perspective view of a heat-insulating block or slab made from or containing my improved heat-resisting material and made by my improved process in which the material is calcined or burned before being molded or formed;

Fig. 3, an enlarged sectional view of a fragment of a brick or block made from my improved heat-insulating material, and showing the cellular character of the material, and Fig. 4, a sectional view of a blast furnace wall formed of heat-insulating bricks or blocks made in accordance with my invention and laid in heat-resisting cement made from or containing my improved heat-insulating material or compound.

In making a composition of matter or material for heat-insulating purposes, and an article of manufacture, such as a brick or wall of a furnace or other structure, in accordance with my invention and improvements, I provide a suitable quantity of diatomaceous earth or diatomaceous earth and asbestos, for making a batch of the material, and a sufficient quantity of water for moistening the same.

The diatomaceous earth, or silica, and the asbestos are disintegrated, pulverized, or reduced to a finely divided state by grinding or crushing said materials in any suitable ordinary and well known manner. I prefer to disintegrate or pulverize the diatomaceous earth and the asbestos separately, and then to intermix them in suitable proportions, and add to the mixture a sufficient quantity of water to moisten the mass so that it will be of the desired consistency for molding in an efficient manner, although it will be readily understood that the diatomaceous earth and asbestos may be ground or pulverized to any desired extent after being mixed together in suitable proportions.

I have found in practice that a composition of matter or compound for heat-insulating purposes may be made in accordance with my invention and improvements by combining and treating the following described elements in the following proportions, and in the manner herein described:

Diatomaceous earth, 75 per cent.
Asbestos (finely divided) 25 per cent., and
Water sufficient to moisten the mass to the desired consistency suitable for molding.

It will be readily understood by those skilled in the art that the proportions of diatomaceous earth and asbestos may be varied to a considerable extent without departing from the spirit of my invention, although the use of the above mentioned elements in the proportions above set forth, or in approximately the proportions designated has been found in practice to be quite satisfactory for the purposes for which the invention is intended.

The material consisting of or comprising diatomaceous earth, or, by preference, diatomaceous earth and asbestos, moistened with water, in approximately the proportions above mentioned, is, by preference, thoroughly stirred or puddled so as to be of uniform consistency throughout and form a homogeneous mass of suitable consistency for molding.

The mixture may be worked or puddled for several hours or for any desired length of time, until it is of the desired uniform consistency throughout, suitable for molding, as above indicated, and then molded, cut, or formed into bricks, blocks, slabs or similar articles suitable for use for heat-insulating or heat-resisting purposes when completed.

During the operation of molding, the material to be operated upon is, by preference, subjected to pressure, the degree of which may vary in accordance with the size or dimensions of the article to be molded. A pressure of approximately 200 pounds, per square inch, is sufficient and satisfactory in most instances. Greater pressure should be employed in molding relatively large articles or blocks, and relatively less pressure would be required for articles of comparatively small dimensions. The pressure should ordinarily be sufficient to properly form the article to be molded, as will be readily understood by those skilled in the art. The proportion of water used for making molded articles should be sufficient to properly moisten the mass to the desired consistency for molding in an efficient manner without causing water to run out of the mold during the molding operation, or while the mass is being subjected to the desired pressure.

I have found in practice that entirely satisfactory results are obtained by moistening the mass of material, consisting of diatomaceous earth, or, by preference, of diatomaceous earth and asbestos in a finely divided condition, as above indicated, with a quantity of water equivalent to approximately one-third of the weight of the original mass to be moistened thereby.

After molding the material into the form of bricks, slabs or other articles, the articles are thoroughly dried. This may be accomplished by heating the material or article to a sufficient temperature for a sufficient length of time to thoroughly remove all moisture from the material. The bricks, slabs or other articles thus obtained and after having been thoroughly dried or dehydrated, are placed in a kiln and burned, or calcined.

Bricks, slabs or other articles suitable for heat-insulating purposes and consisting wholly of diatomaceous earth or, by preference, of diatomaceous earth and asbestos, comminuted and intermixed in suitable proportions, as above indicated, are, in the process of burning, subjected to a gradually increasing temperature such as will not cause unnecessary cracking, until a temperature sufficient to calcine, bake or burn the material, preferably at a red-heat, is reached. The calcining or baking temperature indicated is maintained for a sufficient length of time to properly bake, calcine, or burn the material. The time and degree of the temperature may vary according to the degree of hardness desired, or according to the degree of temperature to which the material or article is to be subjected in use. In practice, satisfactory results have been obtained by subjecting the material to a temperature of approximately 2000° F. to 2800° F., maintained for a period of from 9 to 144 hours or thereabout, according to the degree of hardness of the material desired, or according to the degree of temperature to which the material is to be subjected in use, as already suggested. The articles or material having thus been calcined or burned for the desired length of time and at the desired temperature, are allowed to gradually cool, and are then in finished form and ready for use for heat-insulating purposes, or for any desired purpose.

It has been found in practice that bricks, slabs, blocks, or similar articles made of material such as diatomaceous earth, or of diatomaceous earth and asbestos, comminuted and intermixed, but not calcined or burned before being molded or formed, are liable to shrink and, in some instances, to warp or to become distorted during the process of burning the same or when subjected to the action of heat when in use. It is, of course, very desirable such shrinkage and warping of the molded or completed material or articles be prevented. In order to accomplish this and to provide a heat-insulating material, or composition of matter, or articles made therefrom, such as a brick or slab or similar article suitable for heat-insulating purposes, and an improved process or method of making the same, I provide a suitable quantity of diatomaceous earth, or diatomaceous earth and finely divided asbestos, which I reduce to a finely divided state or comminuted form by grinding or crushing the same in or by means of a suitable crushing device which may be of any ordinary well-known or desired form.

Said material is calcined or burned before being molded, which operation of burning or calcining may be accomplished by subjecting the material to a temperature sufficient to calcine it, and, by preference, sufficient to bring the material to a red-heat, but below the melting point of the material. A temperature of approximately 2000° F. to 3000° F. or more, but, by preference, below the fluxing temperature of the material, maintained for a period of approximately six hours more or less, has been found to produce satisfactory results. The temperature may vary to a considerable extent above or below the stated temperature and the time of burning may be in excess of, or less than the time, above mentioned, according to the temperature to which the material is to be subjected in use.

The disintegrated and calcined or burned material thus obtained is then, by preference, moistened by the addition of a liquid, such as water or by adding a quantity of binding material which may be in the form of what is commonly known as refractory or bonding clay or potters' clay in moist or plastic form. When such a binder is used, I find that very satisfactory results are obtained by employing a quantity of binding material or bonding clay equivalent to approximately 3 to 10 per cent. of the bulk of the entire mass. The material thus obtained, either with or without bonding clay, but, by preference, containing the binder, or bonding clay, as above indicated, is adapted to be used for making heat-insulating bricks, blocks, or walls of furnaces or other structures. The material or mixture in its calcined, baked, or burned condition, or with the diatomaceous earth baked or burned, and used either with or without asbestos, but, preferably, with asbestos, is molded or formed into the shape in which it is intended to be used. The molding may be accomplished by means of an ordinary brick-molding or brick-pressing machine, which machines are well-known and it is therefore deemed unnecessary to illustrate or describe the same in this application, in order to enable the invention to be understood. After molding the material, the material or article in its molded form, or in the shape in which it is intended to remain, may be again subjected to a further operation of burning at a suitable temperature such, for instance, as approximately 2000° F. to 3000° F more or less, for any desired suitable length of time, for instance, approximately six hours or less. Such second or final burning or calcining operation will not cause the material to shrink or warp to any appreciable extent, if at all.

By making the material or mixtures herein described, sufficiently soft and plastic by the introduction of a sufficient quantity or proportion of liquid or moistening material, the said material or mixtures form a very satisfactory and desirable heat-insulating cement adapted for use in laying heat-resisting bricks, or blocks, and for making heat-insulating walls of such material, or for other purposes.

The calcined, baked or burned diatomaceous earth may be comminuted or crushed and intermixed with finely divided asbestos in a raw or unbaked, unburned and uncalcined state, and in any desirable suitable proportions, and either with or without a binder, such, for instance, as refractory or bonding clay, but, by preference, with such binding material intermixed with the diatomaceous earth, or with the diatomaceous earth and asbestos. The material or mixture thus obtained is adapted to be handled and sold and dealt in in its dry form, and before being molded or formed into the shape in which it is intended to be used, and before being softened or rendered plastic by moistening with liquid or by the mixing of any moist binder or plastic material therewith, and may be moistened or rendered plastic, and then molded or formed into the shape in which it is intended to be used, at any convenient place and whenever desired.

After the mixture containing the diatomaceous earth, or diatomaceous earth and asbestos with or without the binder, composed of bonding clay or equivalent material, has been calcined or burned before being molded, and then molded, the article or articles thus molded or obtained, may be again burned, or subjected to the action of great heat, either in the operation of further burning the same or while in actual use for heat-resisting or heat-insulating purposes without causing the article or articles thus obtained to shrink, warp or become distorted.

Bricks, slabs, blocks or similar articles uniformly burned or calcined throughout and which may be of much greater thickness or dimensions than could be otherwise obtained may thus be obtained by calcining or burning the material before molding the same, as above described. The advantage and importance of thus obtaining finished articles of the exact size and dimensions desired, and uniformly burned or calcined throughout regardless of the dimensions or thickness of such articles, and the freedom from shrinkage, warping and distortion thus obtained will be readily understood and appreciated by those skilled in the art.

By calcining or burning the material before molding, less time is required in burning or calcining than is the case when the material is molded before being calcined, baked or burned.

From the foregoing description, it will be readily understood that the material or mixture comprising diatomaceous earth, or diatomaceous earth and a binder, such, for instance, as refractory or bonding clay, or diatomaceous earth calcined or burned and intermixed with finely divided asbestos in either raw or baked, calcined or burned condition and either with or without a binder, and molded or formed, or intended to be moistened, and molded or formed or spread or applied in the form of a cement or otherwise, after the calcining, baking or burning of the diatomaceous earth or the mixture, may contain said materials in any desired suitable proportions, and may be burned for any desired suitable length of time and at any desired suitable temperature such as will result in the production of a simple, economical and efficient heat-insulating material, or compound when treated in the manner herein described:

I have found in practice, that a mixture containing finely divided diatomaceous earth approximately 75 per cent.; asbestos finely divided or fibrous, either baked and calcined or raw and unbaked, but, by preference, calcined, baked or burned, as above described, approximately 25 per cent., and either with or without, but, by preference, with a binder such as refractory or bonding clay equivalent in bulk to approximately 3 per cent. to 10 per cent. of the mass of diatomaceous earth and asbestos, all intermixed, and moistened and molded, by preference, while subjected to suitable pressure as already indicated, or formed into the desired shape, is satisfactory for the purposes for which the material and articles made therefrom are intended.

In the finished product the diatomaceous earth serves as a very efficient heat-insulating or heat-resisting medium; the asbestos, being of a fibrous nature serves to some extent as a binder, and also as a refractory fire-proof or heat resisting medium, and said elements intermixed and calcined form a light strong cellular structure or heat-insulating body. The binder consisting of or containing refractory bonding clay or its equivalent, serves to hold the particles of fine diatomaceous earth and the particles of asbestos in rigid adhesive or cohering contact or relation, and also serves as a heat-resisting medium, and adds to the strength of the structure.

When the material is intended to be used as a cement, it should, of course, be softened or rendered plastic by moistening to a greater extent or by the introduction of a larger proportion of liquid or binding material than when prepared for molding.

A heat-insulating or heat-resisting brick or block 1 made by the process herein above described and from the heat-insulating material, compound, or composition of matter described is shown in Fig. 1 of the accompanying drawings. A relatively large block 2 made by the herein described process in which the diatomaceous earth, or diatomaceous earth and asbestos are baked or burned before the operation of molding, and, by preference, with a binder of moist bonding clay added, and the material afterward molded, is shown in Fig. 2. The texture of the finished product is indicated by the fragment of a brick or block shown in Fig. 3, in which the multiplicity of minute air cells 3 present in the material are shown greatly exaggerated in size. In Fig. 4 a number of bricks, or blocks, such as blocks 1, 2, are shown laid in refractory or heat-insulating cement 4 made as herein above described and all forming a heat-insulating wall of a blast-furnace or similar structure.

I claim:

1. The process of making heat-insulating material, consisting in calcining finely divided diatomaceous earth and finely divided asbestos, adding a binder to said ingredients, thereby forming a plastic mass, and hardening the mixture.

2. The process of making heat-insulating material consisting in calcining diatomaceous earth and reducing the same to a finely divided condition, and intermixing finely divided asbestos with the diatomaceous earth.

3. The process of making heat-insulating material consisting in calcining diatomaceous earth and reducing the same to a finely divided condition, intermixing finely divided asbestos with the diatomaceous earth, adding a binder, then moistening the mixture, then forming the material, and then allowing the material to harden.

4. The process of making heat-insulating material consisting in calcining finely divided diatomaceous earth and finely divided asbestos, intermixing the diatomaceous earth and asbestos, adding a binder, moistening the mixture, and then molding the material into the form in which it is intended to be used.

5. The process of making a plastic heat-insulating composition, consisting in calcining finely divided diatomaceous earth and finely divided asbestos, intermixing and moistening said ingredients, and allowing the mixture to dry and harden.

Signed at Chicago, Illinois, January 16, 1917.

FRANK A. HEADSON.

Witnesses:
 HARRY IRWIN CROMER,
 DAVID H. FLETCHER.